US008683527B2

(12) United States Patent
Pratt et al.

(10) Patent No.: US 8,683,527 B2
(45) Date of Patent: *Mar. 25, 2014

(54) SYSTEM AND APPARATUS FOR SUPPLYING MEDIA CONTENT TO PORTABLE COMMUNICATION DEVICES

(75) Inventors: James Pratt, Round Rock, TX (US); Jeffrey Brandt, Cedar Park, TX (US); Marc Sullivan, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 587 days.

This patent is subject to a terminal disclaimer.

(21) Appl. No.: 11/738,380

(22) Filed: Apr. 20, 2007

(65) Prior Publication Data

US 2008/0261514 A1   Oct. 23, 2008

(51) Int. Cl.
*H04N 5/445* (2011.01)
*H04N 7/16* (2011.01)
*H04N 7/18* (2006.01)

(52) U.S. Cl.
USPC ............ 725/54; 725/39; 725/40; 725/43; 725/62; 725/80; 725/81; 725/85; 725/131; 725/133; 725/141; 725/153

(58) Field of Classification Search
USPC ........... 725/30, 37–40, 43, 54, 62, 78–81, 85, 725/131, 133, 141, 153; 455/3.06; 715/716
See application file for complete search history.

(56) References Cited

U.S. PATENT DOCUMENTS

| | | | | |
|---|---|---|---|---|
| 6,130,726 A * | 10/2000 | Darbee et al. | | 348/734 |
| 6,476,825 B1 * | 11/2002 | Croy et al. | | 715/716 |
| 6,509,908 B1 * | 1/2003 | Croy et al. | | 715/716 |
| 6,768,726 B2 * | 7/2004 | Dorenbosch et al. | | 370/331 |
| 7,319,455 B2 * | 1/2008 | Kunii et al. | | 345/169 |
| 7,344,084 B2 * | 3/2008 | DaCosta | | 235/472.01 |
| 7,706,741 B2 * | 4/2010 | Patel et al. | | 455/3.05 |
| 7,913,278 B2 * | 3/2011 | Ellis et al. | | 725/37 |
| 7,958,530 B2 * | 6/2011 | Fukuda et al. | | 725/62 |
| 8,131,208 B2 * | 3/2012 | Slotznick | | 455/3.05 |
| 2002/0104095 A1 * | 8/2002 | Nguyen et al. | | 725/110 |
| 2002/0138851 A1 * | 9/2002 | Lord et al. | | 725/133 |
| 2003/0002638 A1 | 1/2003 | Kaars | | |
| 2003/0035075 A1 * | 2/2003 | Butler et al. | | 348/734 |
| 2003/0126620 A1 * | 7/2003 | Hayakawa | | 725/133 |
| 2004/0031063 A1 * | 2/2004 | Satoda | | 725/143 |
| 2004/0117831 A1 * | 6/2004 | Ellis et al. | | 725/53 |
| 2004/0261136 A1 * | 12/2004 | Aratani et al. | | 725/151 |
| 2005/0055723 A1 * | 3/2005 | Atad et al. | | 725/80 |
| 2005/0212687 A1 * | 9/2005 | Nishikata | | 340/825.72 |

(Continued)

FOREIGN PATENT DOCUMENTS

EP    1685693    8/2006
JP    2005328394    11/2005

(Continued)

*Primary Examiner* — Pinkal R Chokshi

(74) *Attorney, Agent, or Firm* — Guntin & Gust, PLC; Jay H. Anderson

(57) ABSTRACT

A system and apparatus for supplying media content to portable communication devices is disclosed. An apparatus that incorporates teachings of the present disclosure can include, for example, a Set-Top Box (STB) having a cellular transceiver and a controller element to direct the cellular transceiver to transmit a media guide for the STB to a terminal device for presentation on a display unit of the terminal device. Additional embodiments are disclosed.

25 Claims, 6 Drawing Sheets

(56) References Cited

U.S. PATENT DOCUMENTS

| | | | |
|---|---|---|---|
| 2005/0229223 A1* | 10/2005 | Katagishi et al. | 725/100 |
| 2005/0251821 A1* | 11/2005 | Pina | 725/39 |
| 2006/0031888 A1* | 2/2006 | Sparrell | 725/78 |
| 2006/0053436 A1* | 3/2006 | Allwein et al. | 725/1 |
| 2006/0143651 A1* | 6/2006 | Kim | 725/39 |
| 2006/0247851 A1 | 11/2006 | Morris | |
| 2007/0110035 A1* | 5/2007 | Bennett | 370/352 |
| 2007/0124792 A1* | 5/2007 | Bennett et al. | 725/133 |
| 2007/0130610 A1* | 6/2007 | Aarnio et al. | 725/134 |
| 2007/0143797 A1* | 6/2007 | Sammarco | 725/61 |
| 2008/0092188 A1* | 4/2008 | Rofougaran | 725/111 |
| 2008/0109843 A1* | 5/2008 | Ullah | 725/34 |
| 2008/0134278 A1* | 6/2008 | Al-Karmi | 725/141 |
| 2008/0148331 A1* | 6/2008 | Walter et al. | 725/110 |
| 2008/0163282 A1* | 7/2008 | Reponen et al. | 725/9 |
| 2008/0189743 A1* | 8/2008 | Ellis et al. | 725/39 |
| 2008/0244657 A1* | 10/2008 | Arsenault et al. | 725/48 |
| 2009/0158361 A1* | 6/2009 | Tsusaka et al. | 725/80 |
| 2009/0235317 A1* | 9/2009 | Igarashi | 725/82 |

FOREIGN PATENT DOCUMENTS

| | | |
|---|---|---|
| WO | 0044168 | 7/2000 |
| WO | 0167315 | 9/2001 |
| WO | WO 2006080291 A1 * | 8/2006 |

* cited by examiner

SYSTEM AND APPARATUS FOR SUPPLYING MEDIA CONTENT TO PORTABLE COMMUNICATION DEVICES

RELATED APPLICATION

U.S. patent application Ser. No. 11/612,955, filed Dec. 19, 2006, by Walter et al., entitled "System and Apparatus for Managing Media Content." All sections of the aforementioned application are incorporated herein by reference.

FIELD OF THE DISCLOSURE

The present disclosure relates generally to media systems and more specifically to a system and apparatus for supplying media content to portable communication devices.

BACKGROUND

Most users typically navigate through media content such as television programs viewed on an analog or digital media device with a remote control that manages the media device directly or indirectly by way of a Set-Top Box (STB). Common remote controls are generally mated with a STB or a media device by wireless means (e.g., infrared or radio frequency), and provide a keypad with numeric features and functions for switching channels, viewing programming guides, and controlling overall functions of the STB and/or the media device (e.g., volume, color, contrast, etc.). Although managing presentation of media content in this fashion has been done for a number of years, alternative means for controlling STBs can serve to improve user experience.

A need therefore arises for a system and apparatus for supplying media content to portable communication devices.

DETAILED DESCRIPTION

Embodiments in accordance with the present disclosure provide a system and apparatus for supplying media content to portable communication devices.

In a first embodiment of the present disclosure, a computer-readable storage medium in a terminal device can have computer instructions for receiving a media guide over a cellular wireless signal generated by a Set-Top Box (STB), and presenting on a display unit of the terminal device the media guide without presentation of said media guide on a media device coupled to the STB.

In a second embodiment of the present disclosure, a STB can have a cellular transceiver and a controller element to direct the cellular transceiver to transmit a media guide to a terminal device for presentation on a display unit of the terminal device.

In a third embodiment of the present disclosure, a device can have a short-range cellular base station operably coupled to a media communication device for delivering a media guide to a terminal device.

Figure 1:
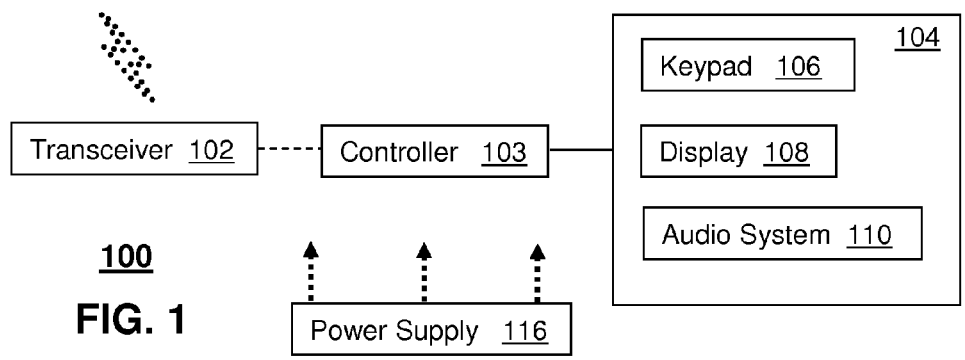
FIG. 1 depicts an exemplary embodiment of a terminal device.

FIG. 1 depicts an exemplary embodiment of a terminal device (TD) 100. The TD 100 can comprise a portable communication device including a wireless transceiver 102, a user interface (UI) 104, a power supply 116, and a controller 103 for managing operations of the foregoing components. The transceiver 102 can support singly or in combination any number of cellular access technologies such as CDMA-1X, W-CDMA/HSDPA, GSM/GPRS, TDMA/EDGE, and EVDO. Next generation cellular access technologies can also be applied to the present disclosure. The TD 100 can perform voice, video and data service functions.

The TD 100 can include an integrated or separate transceiver 102. For example, the TD 100 can integrate a transceiver 102, the controller 103 and the UI 104 into a single unit, such as in a cellular phone. However, in other instances the transceiver 102 need not be integrated into a single TD 100. For example, a cellular device (e.g., cellular phone or cellular access card) can be configured to operate as a transceiver 102 when coupled to another device such as a laptop or other computing device configured to operate as the TD 100. Such external transceivers 102 can be coupled to a TD 100 using common means. For example, the transceiver 102 can comprise a cellular access card inserted into a card slot of a personal digital assistant (PDA), a laptop, or other computing device (e.g., PCMCIA, Cardbus, or SDIO). In another example, a TD 100 can be coupled to a cellular phone using wireless (e.g., Bluetooth, WiFi, or any of the 802.xx protocols as specified by the Institute of Electrical and Electronic Engineers) or wireline connections (e.g., USB or Firewire).

The UI element 104 of the TD 100 can include a keypad 106 with depressible or touch sensitive keys and a navigation element such as a navigation disk, button, roller ball, thumbwheel, or flywheel for manipulating operations of the TD 100. The UI element 104 can further include a display 108 such as monochrome or color LCD (Liquid Crystal Display) which can be touch sensitive for manipulating operations of the TD 100 and for conveying images to the end user of said device, including text messages. The UI element 104 can have an audio system 110 that utilizes common audio technology for conveying and intercepting audible signals of the end user, as well as other audible signals.

The power supply 116 can utilize common power management technologies such as replaceable batteries, supply regulation technologies, and charging system technologies for supplying energy to the components of the TD 100 and to facilitate portable applications. The TD 100 can be an immobile or portable communication device. Power can be derived from a common AC outlet, a cable interface using Power over Ethernet, or other suitable power source means. The controller 103 can utilize computing technologies such as a microprocessor and/or digital signal processor (DSP) with associated storage memory such a Flash, ROM, RAM, SRAM, DRAM or other like technologies for controlling operations of the TD 100.

The TD 100 can be an integrated device or a family of devices, such as configured in a master-slave arrangement. In the latter embodiment, the components of the TD 100 can be reused in different form factors for the master and slave TDs.

Figure 2:
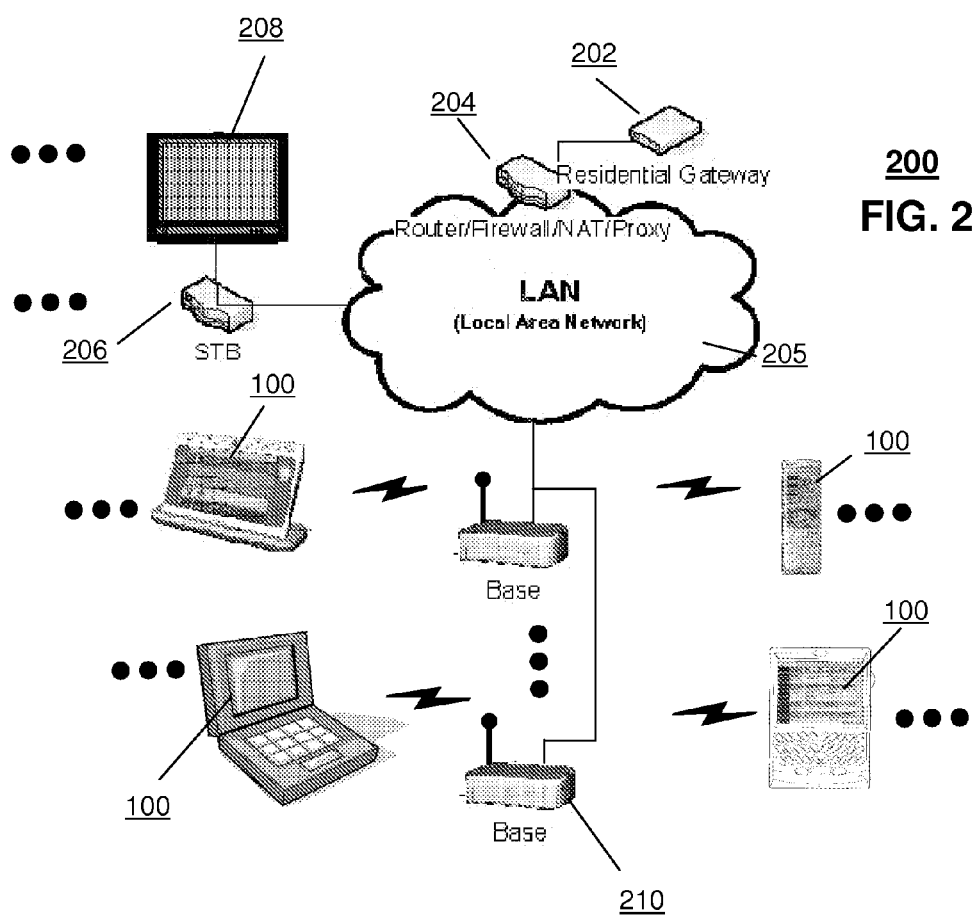
FIG. 2 depicts an exemplary embodiment of the terminal device operating in a media system.

FIG. 2 depicts an exemplary embodiment of the TD 100 operating in a media system 200. In this embodiment, the media system 200 can comprise a gateway 202, for example a residential gateway (RG), that provides access to a service provider's network services such as voice, video and/or data services. The RG 202 can be coupled to a network proxy device 204 that can provide a secure wired and/or wireless local area network (LAN) 205 in a residential or commercial setting. The network proxy 204 can include various components and applications, such as a router and firewall. The RG 202 can be coupled to one or more Set-Top Boxes (STBs) 206 and corresponding media devices 208 (such as analog or digital television sets) for viewing analog or digital (e.g., IPTV) media services. The STBs 206 can be associated with one or more TDs 100 (shown as computing devices and cellular handsets or PDA's). The TDs 100 can communicate with the STBs 206 by way of one or more base stations or units 210 coupled to the LAN 205. Base stations 210 can be associated with single or multiple STBs 206 by common wireless (e.g., Bluetooth, WiFi, or 802.xx protocols) or wireline (e.g., USB, ethernet, or Firewire) means. The STB 206 and base station 210 are shown as separate devices in the illustrated embodiment, but it would be apparent to one of ordinary skill in the art that the base station 210 and the STB 206 can be integrated into a single device. In an integrated device, the STB box 206 and base station 210 can share one or more common components, such as a power regulator.

The base unit 210 can be configured to communicate with the TDs 100 using any number of wireless technologies. For example, the base unit 210 can support singly or in combination any number of cellular access technologies such as CDMA-1X, W-CDMA/HSDPA, GSM/GPRS, TDMA/EDGE, and EVDO. Next generation cellular access technologies can also be applied to the present disclosure. Additionally, the base unit 210 can be configured for short range cellular communications. That is, a transceiver in the base unit 210 can be configured to communicate with TDs 100 only within a limited range. For example, the base unit 210 can be configured to only accept signals from TDs 100 having a signal strength exceeding a threshold value and to transmit signals having only limited signal strength. The threshold value and transmitting signal strength can be chosen based upon a number of factors, including the particular environment where the TD 100 will operate.

Figure 3:
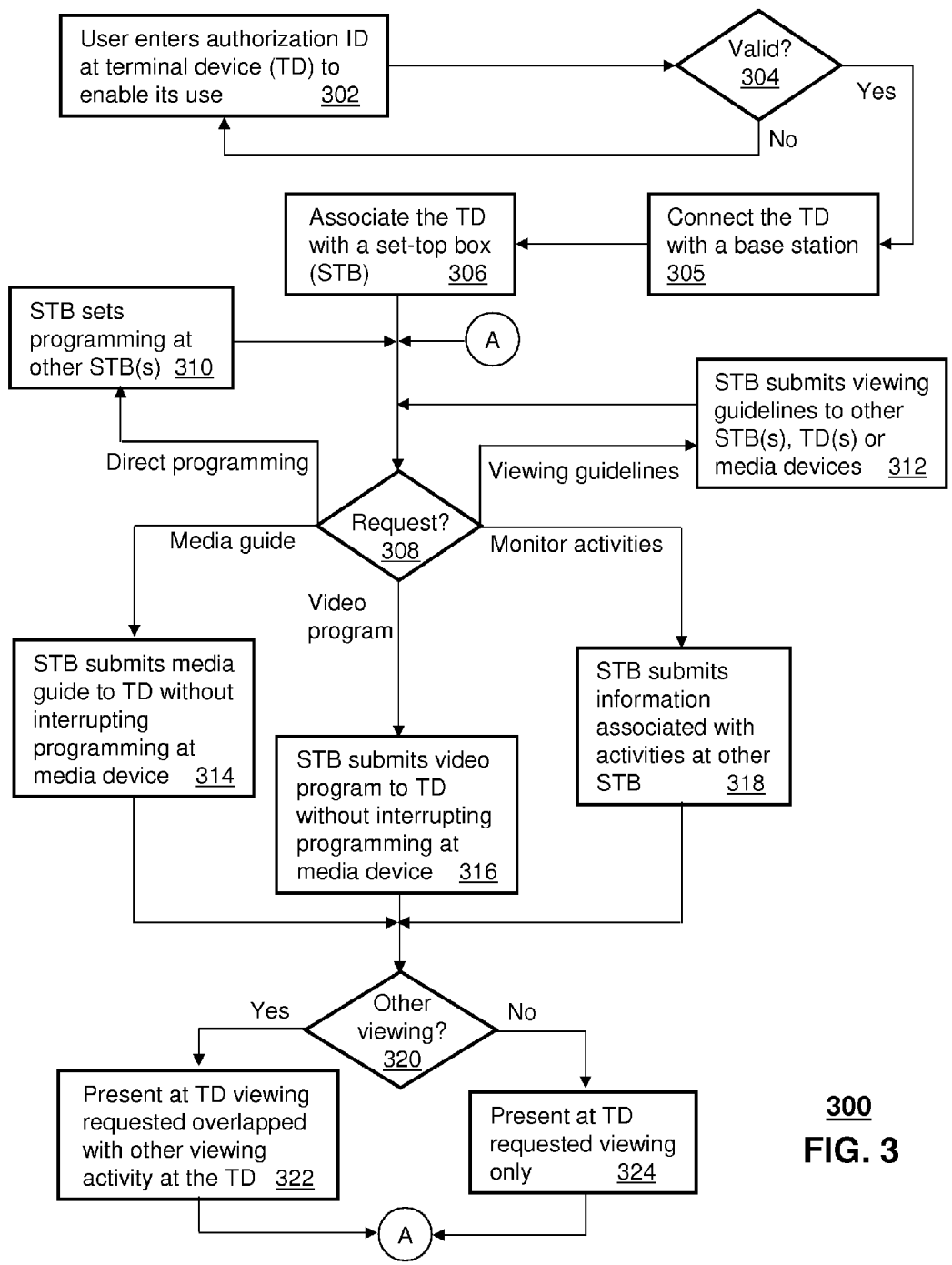
FIG. 3 depicts an exemplary method operating in the media system.

FIG. 3 depicts an exemplary embodiment of a method 300 operating in portions of the media system 200. It would be apparent to an artisan with ordinary skill in the art that other embodiments not depicted in FIG. 3 are possible without departing from the scope of the claims described below.

Method 300 begins with step 302 in which a user enters an authorization ID into a TD 100 to enable its use. This step can be used in cases where end users would like to restrict access to TDs 100 on a per user basis. The authorization ID can be a user ID, a password, a personal identification number (PIN), a biometric ID (e.g., voice, fingerprint, retina, etc.) or other suitable form of identification information. If the authorization ID received by the TD 100 is valid in step 304, then the TD 100 proceeds to steps 305 and 306 where it can connect to the base station 210 and associate itself with a STB 206. If on the other hand the entry is invalid, the TD 100 can reject the authorization ID and return to step 302.

In one embodiment, the TD 100 can reject additional authorization attempts after several consecutive authorization failures. The TD 100 can, for example, reject further attempts for a period of time to reduce the possibility of an unauthorized user guessing the authorization ID. In another embodiment, the TD 100 can submit a notice of possible tampering to its end user by way of, for example, an email or over-the-air message.

As described above, in step 305, the TD 100 can connect with the base station 210. This connection can be reactive such as, for example, an end user of the TD 100 depressing a key function of the UI 104 that connects the TD 100 to the base station 210. The base station 210 can be automatically detected by the TD 100 or identified by the user. Alternatively or in combination with a reactive connection, the connection can be proactive in which the TD 100 automatically connects the TD 100 to any detected base station 210, such as through detecting a presence signal transmitted by one or both of the TD 100 and base station 210.

In one embodiment, whether the connection is reactive or proactive, the TD 100 can automatically disconnect from a cellular network in favor of the detected base station 210. In such instances, the TD 100 can present a notice of disconnection from the cellular network to its end user by way of, for example, a visual notification on the display 108 or an audio notification via the audio system 110. In another embodiment, the TD 100 can also be configured to remain connected to the cellular network to allow a user to continue receiving calls or other communication on the TD, such as voice communication on a cellular phone. In such instances, the TD 100 and the base station 210 can operate as multimodal devices allowing the TD 100 to be simultaneously connected to the base station 210 and a network, such as a cellular network. For, example, a TD 100 comprising a multimodal phone can be configured to remain connected to the cellular network using one type of cellular access technology, and connect to the base station 210 using a second available type of cellular access technology. In another embodiment, the TD 100 can remain connected to the network using one type of wireless access technology (e.g., cellular), and connect to the base station 210 using a second available type of wireless access technology (e.g., WiMax). In yet another embodiment, the TD 100 can use a combination of wireless and wireline access technologies to provide a multimodal device, such as remaining connected to the cellular network using a cellular access technology, and connecting to the base station 210 using a wireline access technology.

In one embodiment, the base station 210 can allow only authorized users to access the LAN 205 and/or any STBs 206 therein via the base station 210. Such a configuration not only prevents unauthorized users from accessing the base station 210, but also can prevent possible interference from cellular devices that happen to be in range of the base station but are not intended to be used as the TD 100. Prior to allowing the user to associate with an STB 206 in step 306, the base station 210 can prompt the user for an authorization ID. The authorization ID can be a user ID, a password, a personal identification number (PIN), a biometric ID (e.g., voice, fingerprint, retina, etc.) or other suitable form of identification information. If the authorization ID received by the base station 210 is valid, then the base station 210 can allow the TD 100 to connect thereto. The base station 210 can be configured to reject additional authorization attempts after several consecutive authorization failures. Furthermore, the base station 210 can also be configured to submit a notice of possible tampering to its end user by way of, for example, an email or over-the-air message. In some instances, the authorization ID can be the same for the TD 100 and the base station 210. However, a different authorization ID for the base station 210 can allow an additional layer of security to be provided to ensure only authorized users access the LAN 205 and/or the STBs 206 through the base station 210.

Once the TD 100 is connected to the base station 210 and has access to the LAN 205, the TD 100 can be configured to associate itself with a STB 206. This association can be reactive such as, for example, an end user of the TD 100 depressing a key function of the UI 104 that submits an access request to the STB 206 by way of the LAN 205 using wired or wireless means. Alternatively or in combination with the reactive association, the association can be proactive in which the TD 100 automatically submits an access request to the STB 206 when it detects the STB is accessible (by polling or other common detection techniques). In instances where the base station 210 is integrated into the STB 206, the TD 100 can be configured to automatically associate with the STB 206 that is associated with the base station 210.

Once the TD 100 has made an association with the STB 206, TD 100 in step 308 monitors for a request from the end user. Based upon the request, the TD 100 can perform a number of functions such as directing programming at other STBs (step 310), setting viewing guidelines at the STBs (step 312), requesting a media guide from a select STB (step 314), requesting a video program from the STB (step 316), requesting monitoring of activities at other STBs (step 318), and/or other common media device 208 operation functions (e.g., volume control, TV contrast, etc.). These requests can be invoked by a single keypad depression or a sequence of interactions with the UI 104 to achieve any one of the aforementioned requests.

Figure 4:
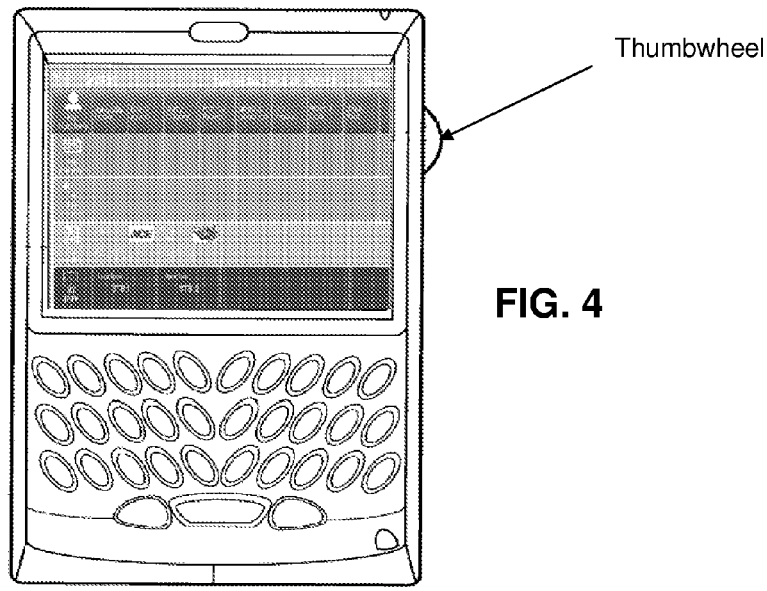
FIGS. 4-8 depict exemplary operational embodiments of the terminal device managing media content.

For example, as shown in the exemplary embodiment of TD 100 of FIG. 4, a user can selectively communicate with STB 1 or STB 2 by touching one of these graphical user interface (GUI) elements on the screen, by entering a keyboard input, and/or by using the thumbwheel or other navigation element for the selection. Once an STB 206 is selected, the TD 100 can present on the display 108 a GUI representing a menu with the aforementioned request options. Alternatively, selection of either of the GUI buttons associated with the STB1 and STB2 can result in the presentation of another GUI in the form of a large remote control unit with the request options and common media device controls (volume, channel changer, imaging functions, etc.) being selectable by way of a touch screen or like selection method.

Referring back to FIG. 3, in Step 310 an end user can direct video programming at multiple media devices 208 (such as in an entertainment setting, e.g., sports bar, or festivity in a residence). In this step, the end user can, for example, select a particular channel or a particular media program to display on all STBs 206 or a group of the STBs rather than having to navigate between STBs. In one embodiment, a user can select a channel or media program of interest, and can select thereafter a broadcast button or function of the GUI remote control unit. Other selection techniques can also be used. In another embodiment, a broadcast channel request from the TD 100 can be transmitted to a single base station 210 which can interact with one or more STBs 206 or by way of an STB 206 associated with the TD 100 making such requests and having the STB 206 rebroadcast such requests to other STBs over the LAN 205.

In step 312, a user can establish viewing guidelines at the STBs 206, TDs 100, and/or media devices 208. This step can serve to establish, for example, parental controls or enterprise policies for the viewing of programming at a number of media devices 208 operating in a select LAN 205. The viewing guidelines can comprise establishing an allowable viewing period at each media device 208, rating restrictions (e.g., PG v. PG-13 or R) for viewing video programs, use restrictions at other TDs 100, or any other suitable use guideline applicable to the present disclosure. The viewing guideline requests can be transmitted by the TD 100 to one STB 206 associated with the TD 100 making such request and coordinating such guidelines with other STBs 206 over the LAN 205. Alternatively, the guidelines can be individually set at each STB 206 by transmitting such requests to a base station 210 associated with each STB.

When requesting a media guide as in step 314, the STB 206 interacting with the TD 100 making the request can submit the media guide to the requesting TD 100 without interrupting program viewing at the media device 208. A media guide can include a media menu for controlling, for example, operations of the media device 208, and/or a media programming guide for navigating through video programs or other media content (e.g., still pictures). In another embodiment, the media device 208 can pause the media program upon receipt of the media guide, and resume the media program once the user has finished review of the media guide.

In step 316, a user can request a particular media program, such as a video program. The video program selected can be a selection made by the end user from the media guide received back in step 314.

In step 318, a user can monitor activities at other STBs 206. The activities monitored can include a live program being viewed at each of the STBs 206, or activity information that describes in text or otherwise what activities are being presented at the media devices 208 associated with the other STBs 206.

Figure 5:
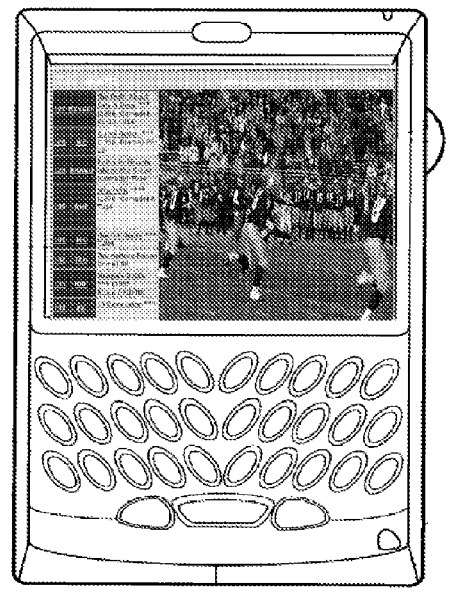
Figure 6:
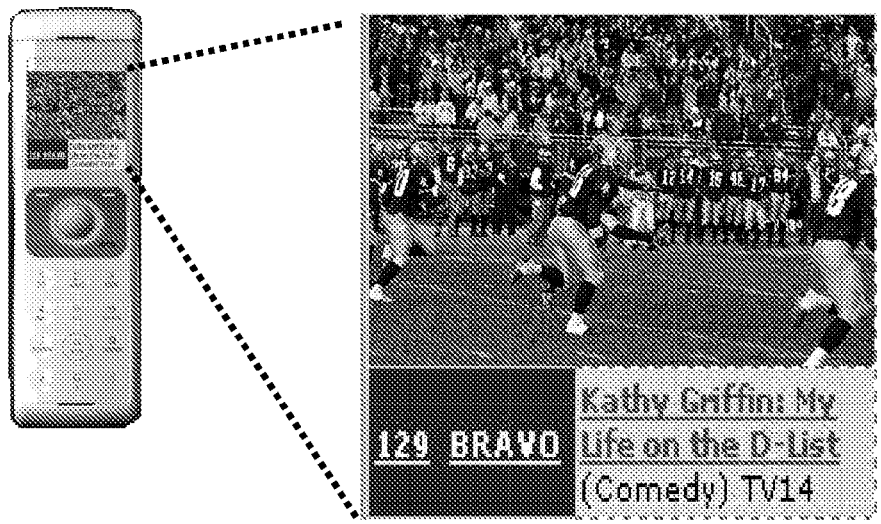
Figure 7:
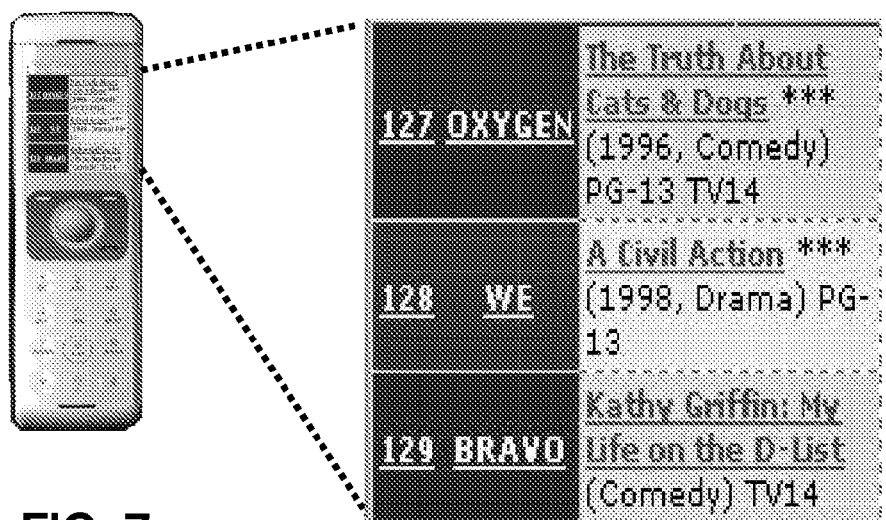
Figure 8:
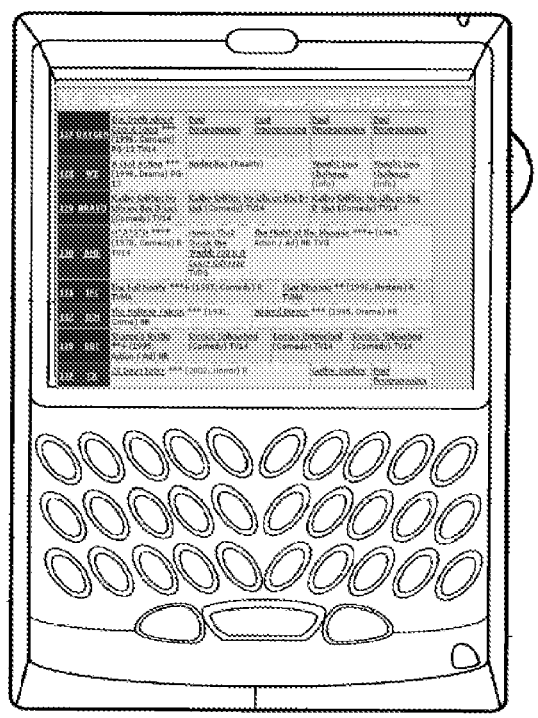

Steps 320-324 can perform the task of determining whether superimposing of viewable or monitored activities are necessary. In step 320, the TD 100 can be programmed to determine if the media guide that was received in step 312 has arrived during another activity (e.g., while a video program is being presented). If it has arrived at such a time, the media guide can be overlapped or superimposed in whole or in part with the current viewing, as in step 322. For example, the TD 100 can display portions of a media guide adjacent to a media program, as shown in the embodiments of FIGS. 5 and 6. If on the other hand, the media guide has not arrived during another activity the TD 100 can present the media guide exclusively, as in step 324. For example, the TD 100 can display only the media guide, as shown in the embodiments of FIGS. 7 and 8.

In one embodiment, if multiple activities are being reviewed at the same time (e.g., step 322), the TD 100 can present a matrix or array of viewable screens so that simultaneous activities can be monitored. In this embodiment, each screen can be selectively navigated or removed. When screen removal occurs, the TD 100 can adjust the size of the remaining screens based on the new accommodated space. Similarly, when a new screen is added, the TD 100 can adjust the size of all screens. Alternatively, or in combination, some screens can be given more priority in size (e.g., menus or program guides) to more effectively interpret and react to the activities being viewed. In yet another embodiment, when too many screens are being activated, some of the screens can be held in a background state. In this embodiment, the TD 100 can be programmed with a panning function which can bring into view hidden screens (similar to a virtual desktop that is larger than a given display size). Other display techniques can be utilized for the TD 100, including cascading and pop-up windows.

Upon reviewing the foregoing embodiments, it would be evident to an artisan with ordinary skill in the art that said embodiments can be modified, reduced, or enhanced without departing from the scope and spirit of the claims described below. There is for instance other viewable media content for which the present disclosure can be applied including streaming video, still pictures, Internet content, music, games and so on. Control can be granted to another TD 100 even where an authorization ID is not provided, such as a guest who desires to control someone else's STB 206, but with his or her own mobile phone. A media device 208, a STB 206, and a base station 210 can be integrated into a single structure to afford users more space and convenience. The configuration and positioning of the media device 208, the STB 206, and the base station 210 can be varied. For example, the base station 210 can be located in proximity to the STB 206, such as being coupled to a network element (e.g., an intelligent network interface device (iNID)) located outside of the building that houses the STB and the media device 208. From these illustrations, it would be evident to said artisan that many modifications can be made to the present disclosure without departing from the scope of the claims stated below. Accordingly, the reader is directed to the claims section for a fuller understanding of the breadth and scope of the present disclosure.

Figure 9:
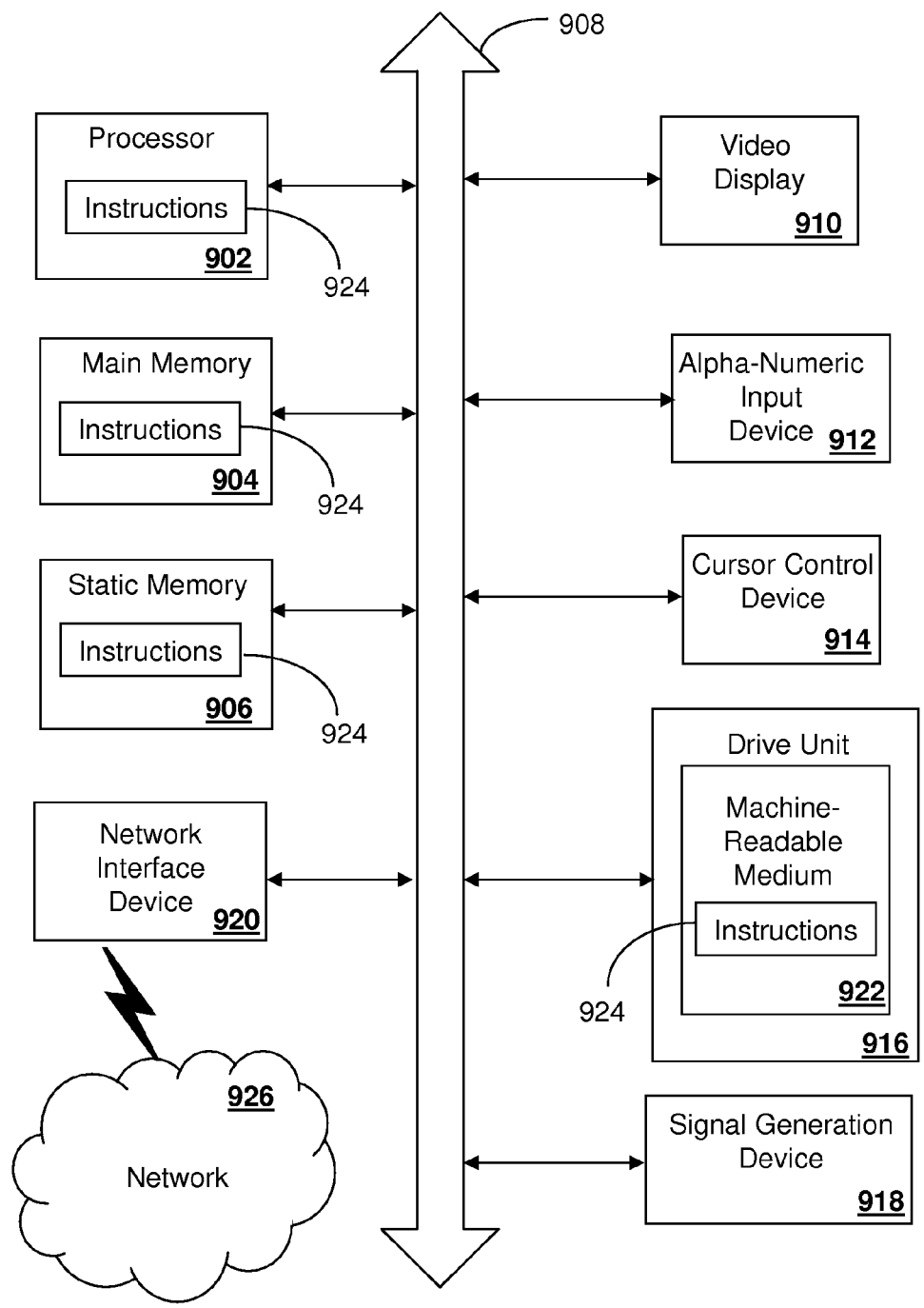
FIG. 9 depicts an exemplary diagrammatic representation of a machine in the form of a computer system within which a set of instructions, when executed, may cause the machine to perform any one or more of the methodologies disclosed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)).

The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible computer-readable storage device comprising executable instructions which when executed by a processor of a cellular phone cause the processor to perform operations comprising:
    automatically detecting a base station in communication with a set top box, in accordance with detecting a presence signal transmitted by the base station;
    automatically connecting with the base station;
    associating with the set top box in accordance with automatically detecting the set top box subsequent to the connecting with the base station,
    receiving a media guide over a cellular wireless access signal generated by the set top box, wherein the media guide comprises media programming guide content, wherein the media guide is received via the base station, the base station communicating with the set top box using worldwide interoperability for microwave access technology, and wherein the base station enables the cellular phone to remotely communicate with the set top box over a pre-configured short cellular communication range that is configured by a cellular transceiver of the set top box using the worldwide interoperability for microwave access technology;
    remaining simultaneously connected to a cellular network using a cellular access technology selected from among the group of global system for mobile communication, code division multiple access, wide-band code division multiple access, or universal mobile telecommunications system;
    presenting on a display unit of the cellular phone the media guide without presentation of the media guide on a media device coupled to the set top box, wherein the cellular phone is adapted to control operations of the set top box via the media guide; and
    providing a request to the set top box for obtaining monitoring information based on monitored activities at other set top boxes;
    receiving the monitoring information from the set top box; and
    presenting on the display unit of the cellular phone a matrix of viewable screens representing (i) the media programming guide content, (ii) media content being presented by all of the other set top boxes and (iii) the monitoring information presenting program information associated with the monitored activities for all of the other set top boxes, thereby permitting viewing at the display unit of a program being simultaneously viewed at one of the other set top boxes.

2. The tangible computer-readable storage device of claim 1, wherein the matrix of viewable screens includes text describing the monitored activities at one of the other set top boxes, and wherein the automatically detecting of the set top box includes providing an access request to the set top box based on polling of the set top box.

3. The tangible computer-readable storage device of claim 1, comprising executable instructions which, responsive to being executed by the processor, cause the processor to perform operations comprising submitting a request to the set top box to view the media programming guide.

4. The tangible computer-readable storage device of claim 3, comprising executable instructions which, responsive to being executed by the processor, cause the processor to perform operations comprising:
    receiving a video program selection from the media programming guide; and
    submitting to the set top box a request to view the selected video program without interrupting an on-going video program presented at the media device.

5. The tangible computer-readable storage device of claim 4, comprising executable instructions which, responsive to being executed by the processor, cause the processor to perform operations comprising:
    receiving from the set top box the video program; and
    presenting the video program on the display unit of the cellular phone.

6. The tangible computer-readable storage device of claim 5, wherein the presentation of the video program and the programming guide are superimposed on each other.

7. The tangible computer-readable storage device of claim 1, comprising executable instructions which, responsive to being executed by the processor, cause the processor to perform operations comprising receiving user input based on a single key depression at the cellular phone for the request for obtaining the monitoring information.

8. The tangible computer-readable storage device of claim 1, comprising executable instructions which, responsive to being executed by the processor, cause the processor to perform operations comprising establishing viewing guidelines at the set top box.

9. The tangible computer-readable storage device of claim 8, wherein the viewing guidelines comprise an allowable viewing period and rating restrictions for viewing video programs.

10. The tangible computer-readable storage device of claim 1, comprising executable instructions which, responsive to being executed by the processor, cause the processor to perform operations comprising restricting access to the cellular phone.

11. The tangible computer-readable storage device of claim 10, comprising executable instructions which, responsive to being executed by the processor, cause the processor to perform operations comprising removing the restricted access to the cellular phone upon receiving a password.

12. The tangible computer-readable storage device of claim 1, comprising executable instructions which, responsive to being executed by the processor, cause the processor to perform operations comprising directing presentation of a media program at one of the other set top boxes.

13. The tangible computer-readable storage device of claim 1, wherein the media guide corresponds to an Internet Protocol Television media menu and an Internet Protocol Television media programming guide, wherein the media device comprises a television set, and wherein the storage device comprises executable instructions which, responsive to being executed by the processor, cause the processor to perform operations comprising associating the cellular phone with the set top box.

14. The tangible computer-readable storage device of claim 2, wherein the cellular wireless access signal supports voice, video and data services.

15. A set-top box, comprising:
a memory to store executable instructions;
a cellular transceiver; and
a controller element coupled with the memory and the cellular transceiver, wherein the controller element, responsive to executing the instructions, performs operations comprising:
directing the cellular transceiver to transmit a media guide to a terminal device for presentation on a display unit of the terminal device, wherein the media guide comprises media programming guide content, wherein the media guide is generated by the set top box and transmitted over a wireless access signal to the terminal device using a first radio access technology via a base station in communication with the set top box, wherein the terminal device automatically detects the base station and automatically connects with the base station in accordance with detecting a presence signal transmitted by the base station, wherein the terminal device is associated with the set top box in accordance with automatically detecting the set top box subsequent to connecting with the base station, and wherein the cellular transceiver enables the terminal device to remotely communicate with the set top box, wherein the terminal device and the set top box communicate only over a pre-configured short cellular communication range that is configured by the cellular transceiver of the set top box and wherein the terminal device is a multimodal device and simultaneously remains connected to a cellular network via a second radio access technology without the use of the base station in communication with the set top box;
receiving a request from the terminal device for monitoring information based on monitored activities at other set top boxes;
obtaining the monitoring information from the other set top boxes; and
providing the monitoring information to the terminal device for presentation on the display unit of the terminal device,
wherein the monitoring information is configured to enable presentation on the display unit of a matrix of viewable screens representing (i) the media programming guide content, (ii) media content being presented by all of the other set to boxes and (iii) the monitoring information presenting program information associated with the monitored activities for all of the other set to boxes, thereby permitting viewing at the display unit of a program being simultaneously viewed at one of the other set top boxes.

16. The set top box of claim 15, wherein the controller element transmits the media guide to the terminal device without presentation of the media guide on a media device coupled to the set top box, wherein the media guide comprises a media menu.

17. The set top box of claim 16, wherein the controller element transmits to the terminal device a video program selected from the media guide without interrupting an ongoing video program presented at the media device.

18. The set top box of claim 16, wherein the controller element transmits a signal to the other set top boxes requesting the monitoring information.

19. The set top box of claim 18, wherein the controller element is directed by the terminal device to establish viewing guidelines at the media device and the other set top boxes.

20. The set top box of claim 19, wherein the viewing guidelines comprise an allowed viewing period and rating restrictions for viewing video programs.

21. The set top box of claim 15, wherein the terminal device and the set top box communicate only over the pre-configured short cellular communication range that is configured by the cellular transceiver of the set top box which is configured to only accept signals from terminal devices having a signal strength exceeding a threshold value and to transmit signals having only limited signal strength.

22. A tangible computer readable storage device comprising executable instructions which, responsive to being executed by a processor of a set top box, cause the processor to perform operations comprising:
directing a cellular transceiver of the set top box to transmit a media guide to a terminal device for presentation on a display unit of the terminal device, wherein the media guide comprises media programming wide content, wherein the media guide is generated by the set top box and transmitted over a wireless access signal to the terminal device using a first radio access technology via a base station in communication with the set top box, wherein the terminal device automatically detects the base station and automatically connects with the base station in accordance with detecting a presence signal transmitted by the base station, wherein the terminal device is associated with the set top box in accordance with automatically detecting the set top box subsequent to connecting with the base station, and wherein the cellular transceiver enables the terminal device to remotely communicate with the set top box, wherein the terminal device and the set top box communicate only over a pre-configured short cellular communication range that is configured by the cellular transceiver of the set top box and wherein the terminal device is a multimodal device and simultaneously remains connected to a cellular network utilizing a second radio access technology without the use of the a-base station in communication with the set top box;
receiving a request from the terminal device for monitoring information based on monitored activities at other set top boxes;
obtaining the monitoring information from the other set top boxes; and providing the monitoring information to the terminal device for presentation on the display unit of the terminal device,
   wherein the monitoring information is configured to enable presentation on the display unit of a matrix of viewable screens representing (i) the media programming guide content, (ii) media content being presented by all of the other set top boxes and (iii), the monitoring information presenting program information associated with the monitored activities for all of the other set to boxes, thereby permitting viewing at the display unit of a program being simultaneously viewed at one of the other set top boxes.

23. The tangible computer readable storage device of claim 22, wherein the media guide comprises a menu for controlling a media device associated with the set top box, and wherein the operations further comprise:
   causing a pause in a presentation of a media program on the media device in accordance with receipt of the media guide at the terminal device; and
   causing the presentation of the media program to resume in accordance with a user input via the menu.

24. The tangible computer-readable storage device of claim 1, wherein the media guide comprises a menu for controlling the media device, and wherein the operations further comprise:
   causing a pause in a presentation of a media program on the media device in accordance with receiving the media guide; and
   causing the presentation of the media program to resume in accordance with a user input via the menu.

25. The set top box of claim 15, wherein the media guide comprises a menu for controlling a media device associated with the set top box, and wherein the operations further comprise:
   causing a pause in a presentation of a media program on the media device, in accordance with receipt of the media guide at the terminal device; and
   causing the presentation of the media program to resume in accordance with a user input via the menu.

\* \* \* \* \*